Feb. 28, 1939.                J. A. McGREW                2,149,063
                                LOCOMOTIVE
                          Filed April 23, 1937        4 Sheets-Sheet 3
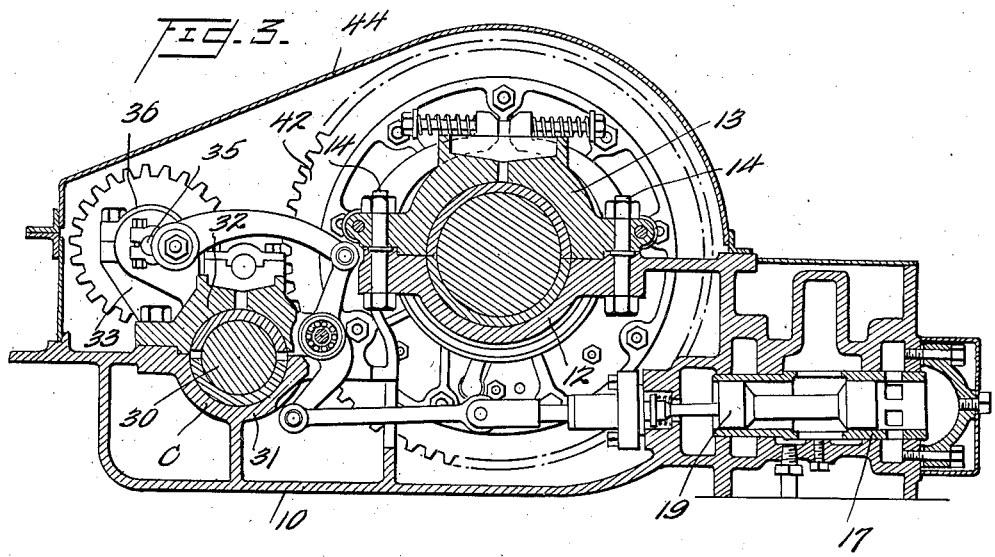
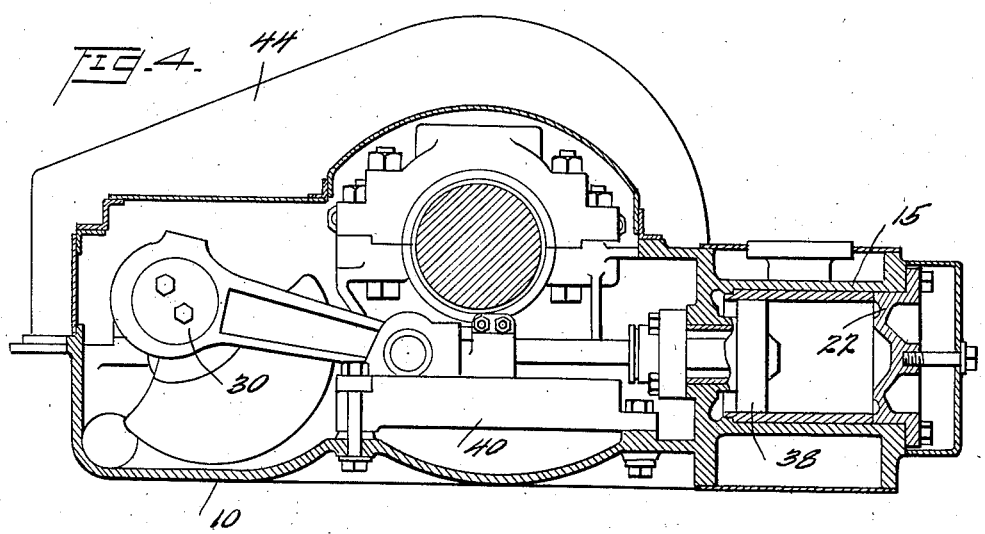
Inventor
J. A. McGrew
By Watson, Coit, Morel &
Grindle
Attorney Feb. 28, 1939.  J. A. McGREW  2,149,063
LOCOMOTIVE
Filed April 23, 1937   4 Sheets-Sheet 4
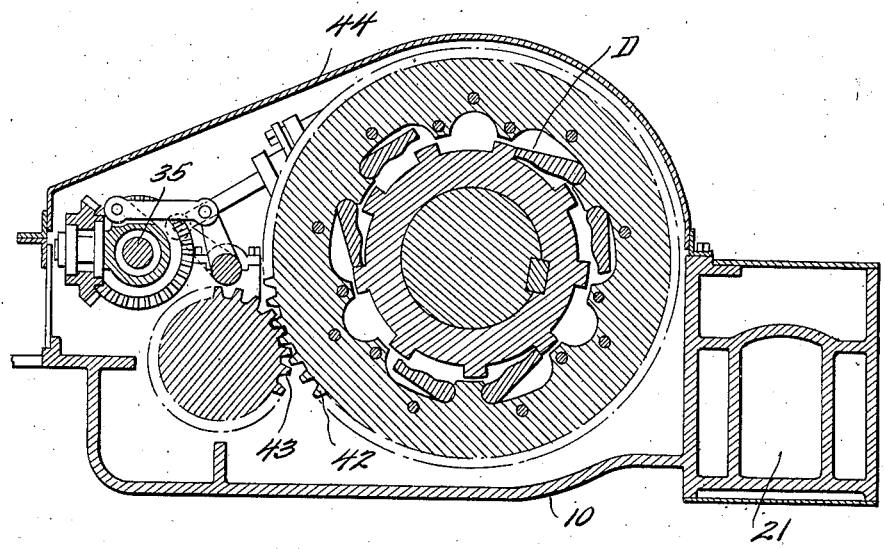
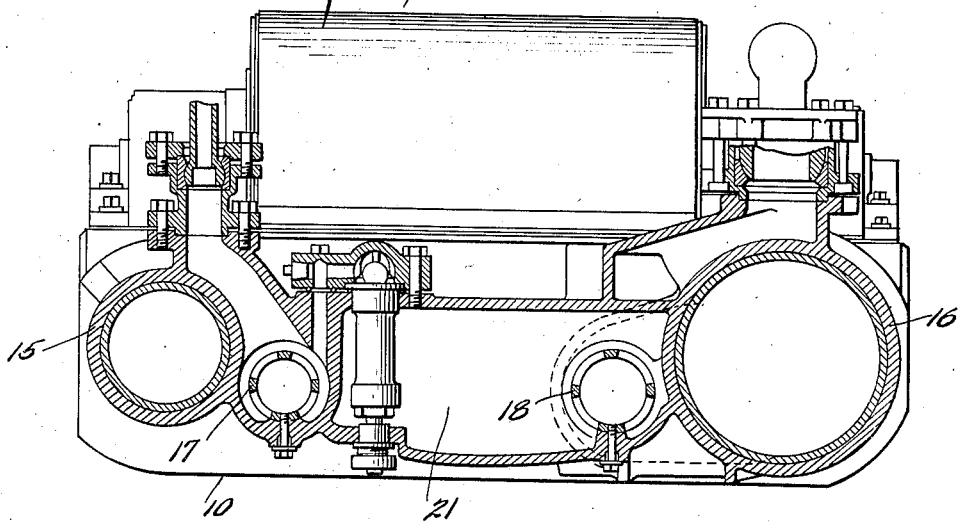
Inventor
J. A. McGrew
By Watson Coit Morse
Trindle
Attorney Patented Feb. 28, 1939

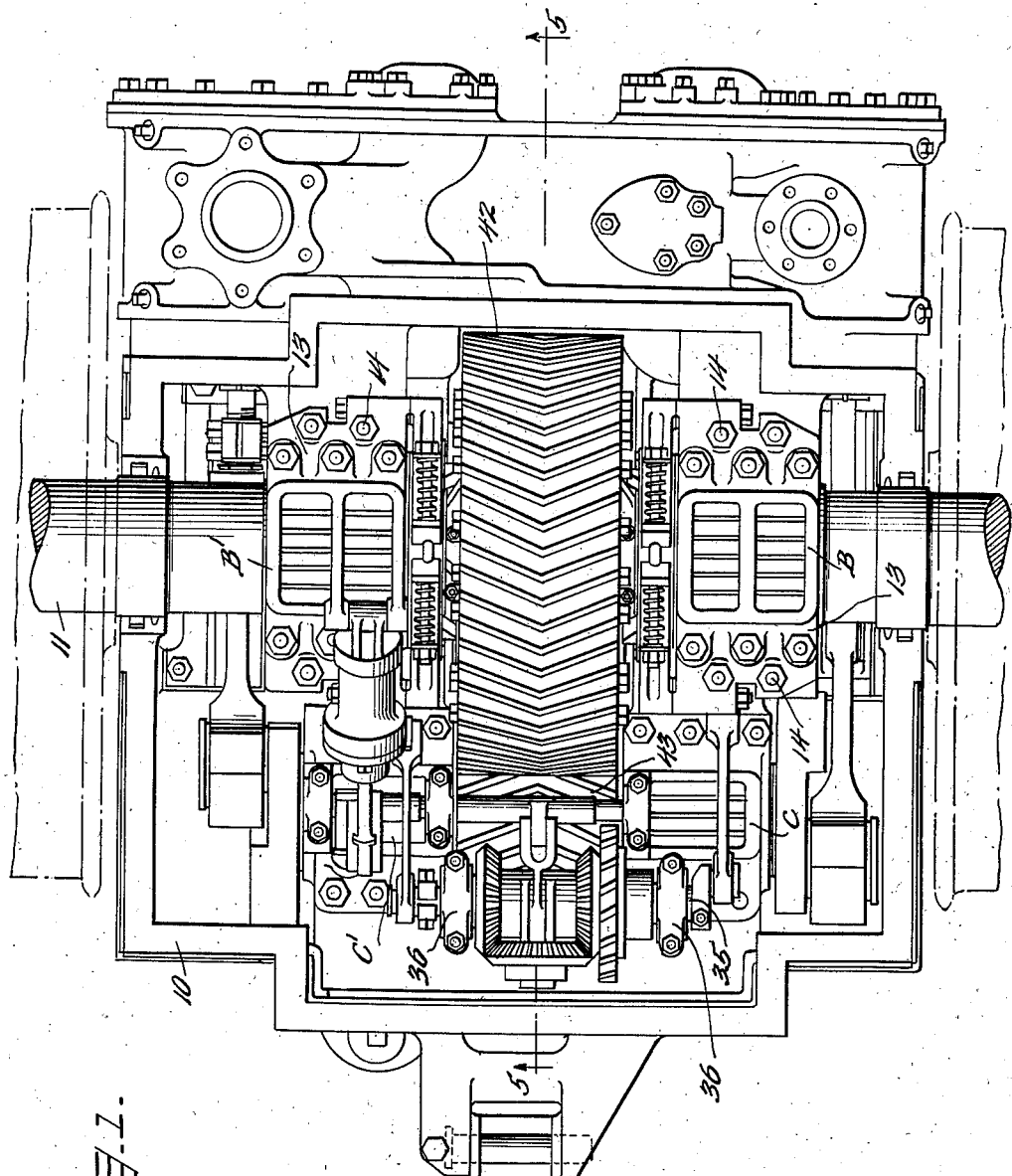

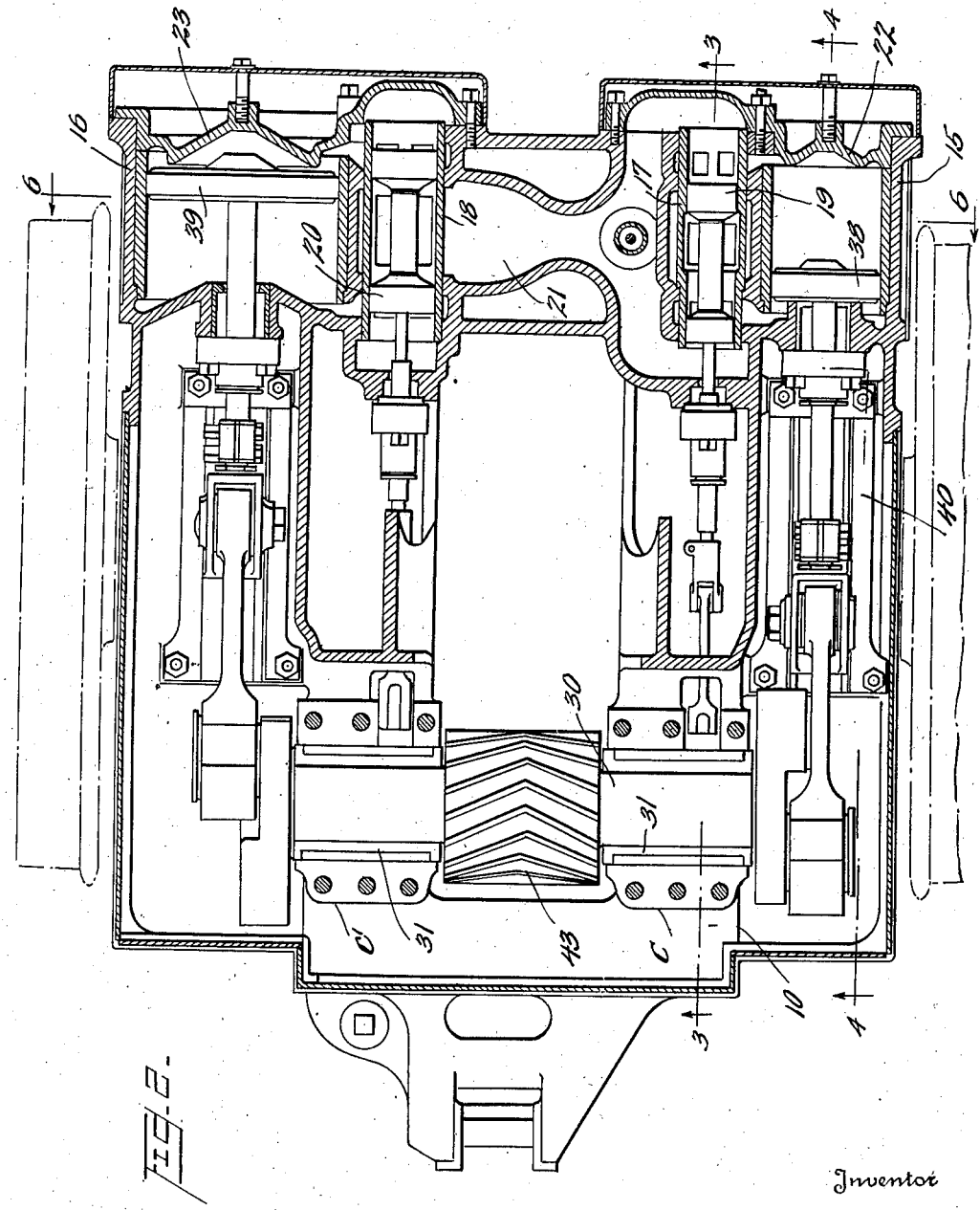

2,149,063

UNITED STATES PATENT OFFICE 2,149,063

LOCOMOTIVE

John A. McGrew, Albany, N. Y.

Application April 23, 1937, Serial No. 138,667

5 Claims. (Cl. 121—122)

The present invention relates to steam actuated motors for use on railroads, particularly to the type of motor designed and intended to be placed in the restricted space intermediate the boiler and chassis of a locomotive and the trackway or intermediate the body of a locomotive tender and trackway.

Motors of this type have been made use of successfully in railroad practice for a number of years. In the usual case the motor is intended for auxiliary use only, being mounted upon or associated with a load-bearing but normally idle axle and being called upon to apply driving force to such axle when, and only when, the locomotive or train is starting or is proceeding at relatively low speeds, being disconnected from the driven axle when the locomotive or train is moving at higher speeds. Steam actuated motors of the type which are made use of only under the circumstances just above indicated, are generally designated boosters or auxiliary propulsion units. If desired, however, a plurality of such motors may be so cooperatively arranged as to collectively comprise the entire motor means for propelling a locomotive or train, the usual main propulsion means being dispensed with. However made use of, one problem continually presents itself, i. e. the problem of so designing the framework and operating parts of the steam actuated motor in order that a propulsion unit of highest possible efficiency may result, but without at the same time devising a unit which cannot be conveniently placed in the extremely small space available. This problem has been approached in various ways and I have heretofore suggested that an advantageous design of this character comprises a motor frame having axle receiving bearings positioned approximately midway between the ends of the frame, the engine cylinders being located at one end of this frame, the driven axle bearings toward the other end, and the operating parts of the driving mechanism extending longitudinally of the frame and passing beneath the axis of the axle bearings. The frame is thus mounted upon the axle which the motor is intended to drive and, to prevent rotation of the frame about the axle in a vertical plane when the motor applies a driving torque to the axle, one end of the frame is connected by a linkage or other appropriate means to the car body or frame above the same.

The type of propulsion unit just above briefly described has numerous advantages over those previously designed or placed in use and it is the purpose of the present invention to further refine and improve this type of propulsion unit, particularly the frame, by the redesign and relocation of certain of its essential elements, the general purpose of the invention being to provide a propulsion unit of the type indicated capable of developing substantial power when in operation, the space requirements of which are such that it may be readily used in any of the restricted spaces in which such motors are commonly used and which is of the simplest character, lightest possible weight, and lowest possible cost.

In the accompanying drawings one embodiment of the invention is illustrated by way of example, and will be hereinafter described in detail. It will be appreciated, however, by one skilled in the art that the frame design may be modified in minor respects in the design and fabrication of steam actuated motors intended for different ultimate uses.

In the drawings

Figure 1 illustrates in plan the novel frame, various operating parts of the motor being also shown;

Figure 2 is a horizontal section through the frame, taken on the plane which includes the axes of the steam cylinders;

Figure 3 is a section on line 3—3 of Figure 2;

Figure 4 is a section on line 4—4 of Figure 2;

Figure 5 is a section on line 5—5 of Figure 1; and

Figure 6 is a section on line 6—6 of Figure 2, the pistons and valves, however, having been omitted.

As seen in plan (Figures 1 and 2), the frame, which is generally indicated at 10, is rectangular, being, as a matter of fact, substantially square, and as seen in longitudinal section (Figures 3 and 5), it appears as a framework, the length of which is considerably greater than its depth. Located approximately midway between the ends of the frame are the large bearings B and B', these bearings being positioned equi-distantly from the longitudinal axis of the frame and being aligned so that the cylindrical bearing surfaces thereof are coaxial. The bearings B and B' are of heavy construction and the axle 11, which carries by far the major portion of the weight of the frame and all of the operating mechanism, passes through these laterally spaced bearings and is rotatably retained therein. Each bearing comprises a lower half 12 integral with the frame and an upper half or cap 13, bolts 14 securing the cap to the lower bearing half. At the forward corners of the frame are the steam cylinders 15 and 16 respectively, the first mentioned cylinder being of less diameter than the last mentioned cylinder since the motor is of the cross-compound type, live steam from the boiler being passed into and through cylinder 15 in the first instance, and thereafter into and through cylinder 16. Valve cages for the cylinders 15 and 16 are indicated at 17 and 18, the valve cage associated with each cylinder having its axis parallel to the axis of that cylinder and each such cage supporting for sliding movement therein a steam control valve, the valves being indicated at 19 and 20. A passage extends transversely of the frame from one valve cage to the other, this passage being indicated at 21 and comprising in reality a receiver into which steam discharged from the high pressure cylinder is passed and from which steam for the energization of the low pressure cylinder is withdrawn. The valve cages and cylinder linings are formed separately from the body of the frame proper but the cylinders, receiver, and steam passages are all formed as integral parts of the frame. Affixed by bolts to the forward end of the frame are cover plates, indicated at 22 and 23 respectively, for the cylinders, these plates comprising in reality cylinder heads but having extensions which project in front of the valve cages and define, in conjunction with the adjacent portions of the frame, steam passages.

Toward the opposite end of the frame, and on the opposite side of the axis of bearings B and B', are transversely spaced bearings C and C' for a driving shaft indicated at 30, the lower half portion of each of the bearings C and C', one of which is indicated at 31, being integral with the frame proper, and the upper half portion 32 comprising a cap secured by suitable bolts to the lower portion. Bearings C and C' are equi-distantly spaced from the longitudinal central axis of the frame and the axis of these bearings, which is also the axis of driving shaft 30, is substantially below the axis of the axle 11. Bearing caps 32 function not only as bearing caps but comprise rigid bases respectively for brackets 33 of similar design and which extend upwardly and outwardly, the upper most portions of these brackets comprising bearings for a transversely extending eccentric shaft 35, which shaft comprises a portion of the valve operating mechanism more fully described in my application Serial No. 21,855, filed May 16, 1935, now Patent No. 2,078,262, granted April 27, 1937.

The axis of shaft 35, and hence the axis of bearing 36 in which this shaft is rotatably supported, is substantially in the horizontal plane of the axis of axle 11, whereas the axis of the driving shaft 30 is substantially in the horizontal plane which includes the axes of the driving cylinders. The plane which includes the axes of the cylinders and the axis of driving shaft 30 is parallel to but substantially below the plane which includes the axes of axle 11 and eccentric shaft 35. The operative connections between the pistons, which are indicated at 38 and 39 respectively, and the driving shaft 30 need not be described in detail, these connections being fully disclosed in my application Serial No. 21,855 above referred to.

Mounted upon the axle 11 intermediate the bearings B and B' is a driven gear 42 of large diameter and which is adapted to be clutched to or disconnected from the axle by clutch mechanism generally indicated at D and which encircles the axle. Fixed upon the driving shaft 30 is a driving pinion 43 in constant mesh with the driven gear 42. Encasing the driven gear 42 and all of the other operating parts of the mechanism upon the upper side is a casing member 44 which comprises a complete closure, preventing the entrance of dust and water and likewise functioning, together with the frame, to retain lubricating oil in order that no oil may be lost by splashing, the majority of the operating parts of the motor mechanism being supplied with lubricant by the splash system.

In order that the driven gear 42 may be of large diameter, the frame is so designed that its over-all height is just adequate to receive this gear, there being no operating parts either above or below the gear. By positioning the steam cylinders at the corners of the frame and placing the valve cages between the cylinders, simplicity of casting and lightness of weight are realized and furthermore the valve operating mechanisms may be actuated by means which includes an eccentric shaft of relatively short length. Likewise the piston rods, etc. are disposed in longitudinally extending chambers formed in the frame which lie outside of the bearings B and B', as shown in Figure 2, whereas the valve actuating rods pass beneath the bearings, as indicated in Figure 3. By designing the frame in the manner described not only are advantages in frame design and manufacture realized but advantageous relocations of the operating parts may be effected whereby the entire mechanism, including both frame and operating parts, is simplified and the space required for the installation of a steam actuated motor of given horsepower reduced to a minimum. The frame includes the usual frame extension F, by means of which one end of it may be linked or otherwise connected to a portion of a locomotive or locomotive tender, body, or chassis.

Having thus described the invention, what is claimed as new and desired to be secured by Letters Patent is:

1. In a steam actuated motor for railroad use, in combination, a frame substantially rectangular in plan and having transversely spaced bearings adapted to receive a transversely disposed axle, the axis of said axle bearings being substantially equi-distant from the ends of the frame and the space intermediate said bearings and above the frame bottom being unobstructed, so as to receive a large diameter driven gear mounted on the axle, cylinders at the corners of the frame upon one side of said axis, valve cages intermediate the cylinders, and bearings upon the opposite side of said axis for the reception of a driving shaft.

2. In a steam actuated motor for railroad use, in combination, a frame substantially rectangular in plan and having transversely spaced bearings adapted to receive a transversely disposed axle, the axis of said axle bearings being substantially equi-distant from the ends of the frame, cylinders at the corners of the frame upon one side of said axis, bearings upon the opposite side of said axis for the reception of a driving shaft, and additional bearings mounted on said driving shaft bearings for the reception of the shaft of a valve operating mechanism.

3. The combination set forth in claim 2 in which the axis of the bearings for the last mentioned shaft is substantially in the horizontal plane of the axis of the axle bearings.

4. The combination set forth in claim 2 in which the axis of the bearings for the last mentioned shaft is substantially in the plane of the axis of the axle bearings, and a plane which includes the cylinder axes and axis of the bearings for the driving shaft, is below said first mentioned plane.

5. In a steam actuated motor for railroad use, in combination, a frame having transversely spaced bearings for an axle to be driven, transversely spaced bearings for a driving shaft, and bearings for an eccentric shaft, said last mentioned bearings being mounted upon the caps of the driving shaft bearings.

JOHN A. McGREW.